United States Patent [19]

Stine

[11] Patent Number: 4,784,524

[45] Date of Patent: Nov. 15, 1988

[54] RAILROAD CABLE LAYING APPARATUS WITH PLOW BLADE SUPPORT AND DUAL PLOW TETHERING

[75] Inventor: Herman Stine, Dillsburg, Pa.

[73] Assignee: Henkels & McCoy, Inc., Blue Bell, Pa.

[21] Appl. No.: 38,128

[22] Filed: Apr. 14, 1987

[51] Int. Cl.$^4$ ............................................. F16L 1/02
[52] U.S. Cl. ................................. 405/174; 172/466; 172/662; 405/180
[58] Field of Search .............. 405/174, 178, 180, 183; 37/72, 91; 172/311, 450, 456, 457, 662, 699, 700

[56] References Cited

U.S. PATENT DOCUMENTS 1,531,975  3/1925  Reynolds ..................... 172/662 X
3,546,887  12/1970  Helmus ......................... 405/180
4,351,122  9/1982  Cornelis et al. .................... 37/72 X

FOREIGN PATENT DOCUMENTS 0086050  8/1983  European Pat. Off. .............. 37/91

Primary Examiner—David H. Corbin
Attorney, Agent, or Firm—Caesar, Rivise, Bernstein, Cohen & Pokotilow, Ltd.

[57] ABSTRACT

An apparatus for holding the plow blade of a railroad car-mounted cable laying device which includes support means on the railroad car for supporting the plow blade thereon and stop means on the support means for prohibiting the plow blade from sliding off the support means. When more than one plow blade is provided, tethering means is also provided between the plow blades for constraining the plow blades and prohibiting the plow blades from sliding off the support means.

7 Claims, 3 Drawing Sheets

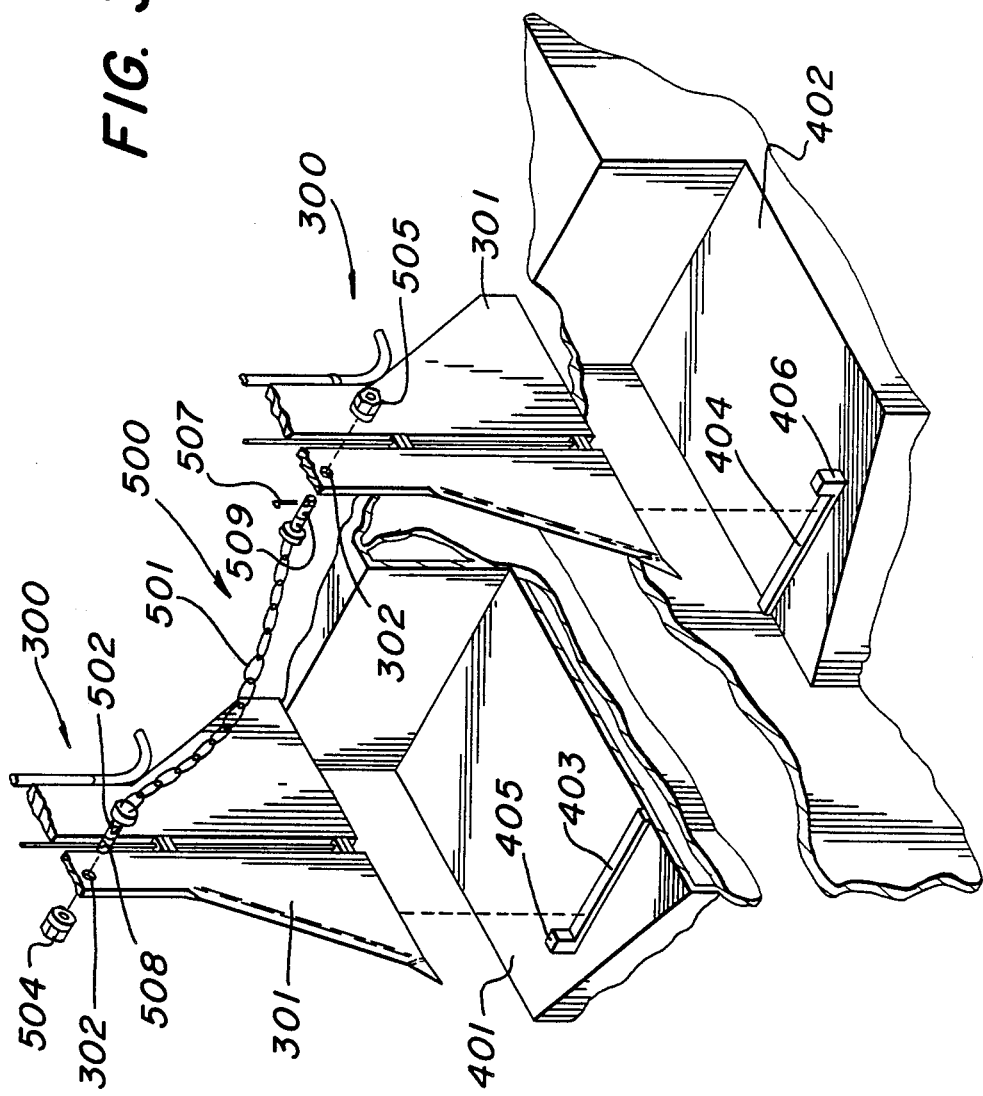

RAILROAD CABLE LAYING APPARATUS WITH PLOW BLADE SUPPORT AND DUAL PLOW TETHERING

BACKGROUND OF THE INVENTION

This present invention relates generally to the art of laying cable along railroad tracks and more particularly, the invention relates to an apparatus for securing plow blades used to lay cable to a mobile railroad car platform.

The prior art, to the extent shown, discloses numerous mechanical devices for laying or burying cable along railroad tracks. Movement along the track is provided by a track equipped tractor known generally in the art as a crawler. The invention which is shown in U.S. Pat. No. 3,546,887 to Helmus discloses such a prior art cable laying apparatus. The present invention is intended to be an improvement over the type of cable laying apparatus disclosed in the prior Helmus patent.

The cable laying apparatus of the type shown in the Helmus patent provides the ability to lay or bury railside cables or conduits without damaging the roadbed and which may be operated within the limited space alongside the tracks which oftentimes does not permit the use of ground-supported, rather than track-supported, equipment, e.g., along steep embankments.

Generally, such a cable laying apparatus incorporates a highly maneuverable earth cutting blade which plows into the earth along the railroad bed and enables cable to be laid at specified depths spaced from the railroad tie ends. Of particular importance in these types of track-mounted cable laying devices is the provision of two blades, one on either side of the track-mounted platform. By providing two blades, it is possible to bury cable or conduit on both sides of a railroad track without having to turn the apparatus around to bury the cable on the other side of the track. Instead, the apparatus is just backed up and the opposite blade lowered to bury the cable or conduit on the side opposite where the cable or conduit was previously laid.

The blades are mounted on hydraulically-operated plow arms which swing outward from the railroad car and move the blades upward and downward. Additionally the plow arms are provided with rotating members which rotate the blades at an angle to the roadbed as well.

A primary disadvantage of these previous types of cable laying apparatuses with dual plow arms has been the necessity of removing the cutting blade from the plow arm in order to transport the track-mounted apparatus over long distances. There has been no way to transport the plow arm to different cable laying locations with the blade attached thereto.

OBJECTS OF THE INVENTION

With the above background in mind, it is a primary object of the present invention to provide an apparatus for a dual plow railroad cable laying apparatus which allows the cable laying apparatus to be transported without removing the plow cutting blades therefrom.

It is a further object of the invention to provide a restraint for holding the cutting blades securely so that they will not easily be dislocated during transportation.

Yet a further object of the invention is to provide a tethering device for restraining the dual plow members in position for transportation.

SUMMARY OF THE INVENTION

In furtherance of these objectives, the present invention provides a pair of plow blade rests fitted into the inset portion of an I-shaped railroad car for receiving and supporting the plow blades of a cable-laying device mounted on the railroad car. Each rest has a stop bar extending upward therefrom which abuts the outer edge of the plow blade to prevent the blade from sliding off of the rest when the railroad car is in motion. A tethering device in the form of a chain with fasteners on each end is connected between the two plow blades on the blade rests. The fasteners are preferably in the form of pins which pass through holes in the plow blades and are fastened to the plow blades by nuts threaded onto the pins.

DESCRIPTION OF THE DRAWINGS

Other objects and many of the attendant advantages of the instant invention will be readily appreciated as the same become understood by reference to the following detailed description when considered in consideration with the accompanying drawings wherein:

FIG. 3 is a fragmented view showing the positioning of the plow blade members above the plow blade supports and the positioning of the tethering device between the two plow blades.

DETAILED DESCRIPTION OF THE PREFERRED EMBODIMENT

Figure 1:
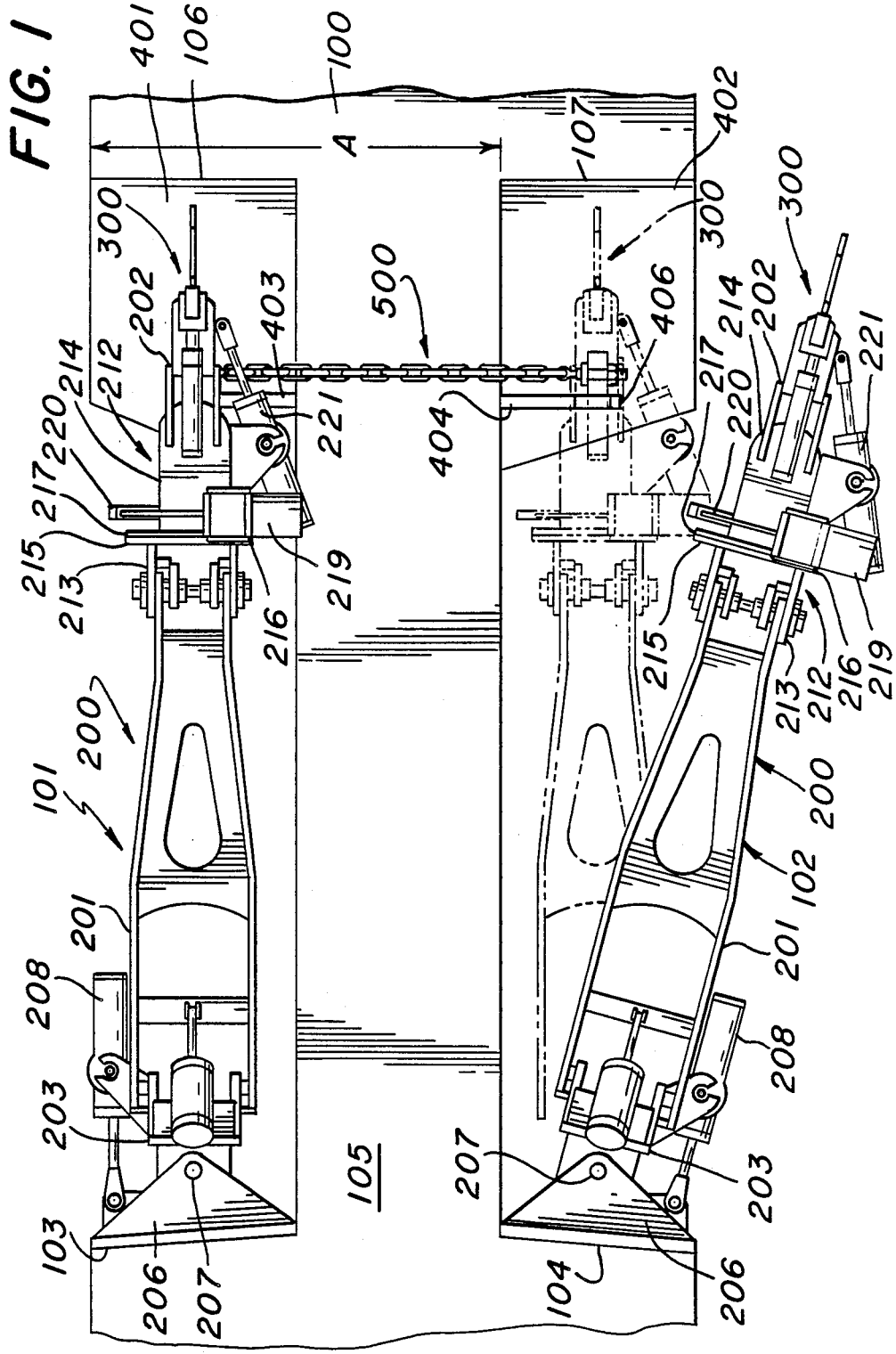
FIG. 1 is a top plan view of the dual plow cable laying device of the present invention showing the plow blade support and tethering device.
Figure 2:
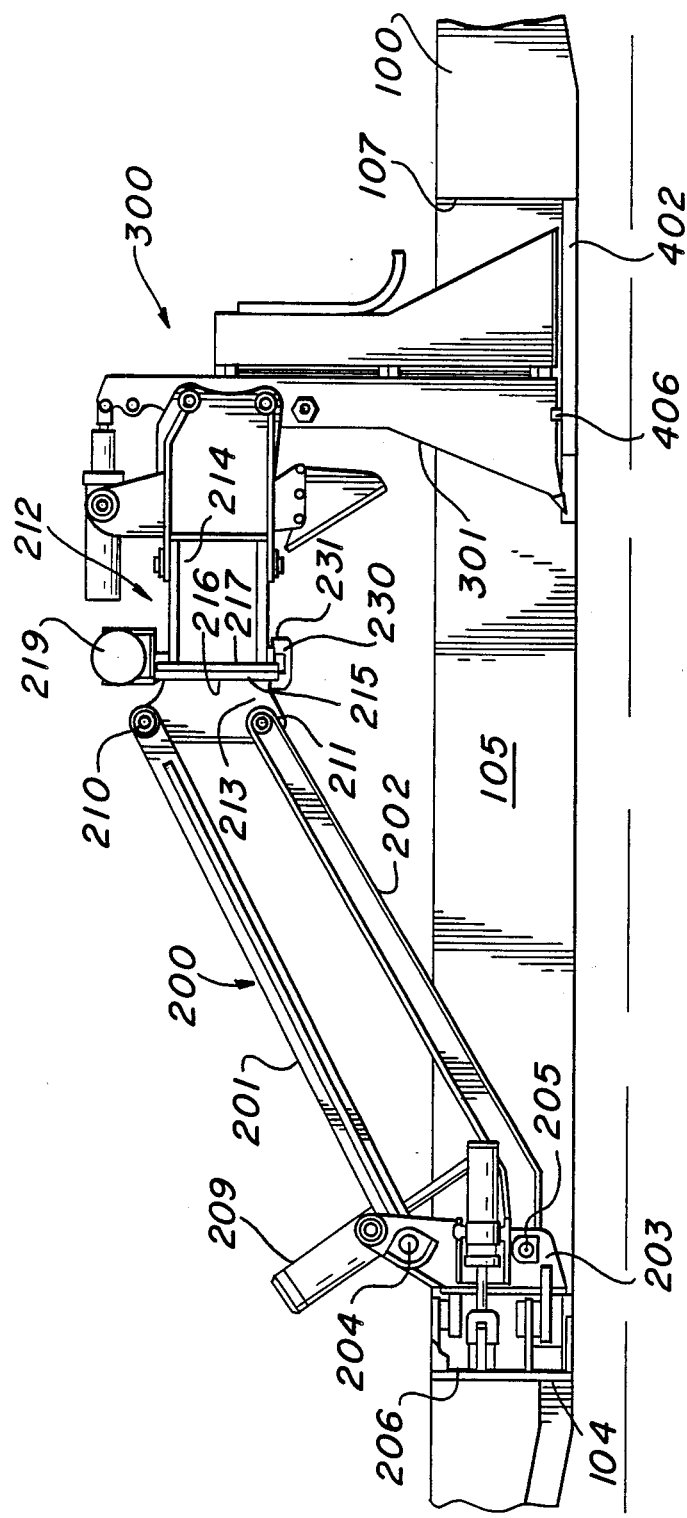
FIG. 2 is a side view of one of the pivot arms showing a plow blade mounted thereon.

Referring now in greater detail to the various figures of the drawings wherein like reference characters refer to like parts, the plow blade supports 401, 402 and tethering device 500 of the present invention is generally shown in FIGS. 1 and 2. A railroad car chassis has a substantially "I-shaped" module 100 fitted thereon and is provided with two cable laying assemblies 101, 102. The two cable laying assemblies 101, 102 are substantially similar and reference to the components of each will be by means of identical reference numerals. Each cable laying assembly includes a plow arm 200 mounted onto the forward ends 103, 104 of the railroad car module 100 within the inset portions created by the longitudinal center portion 105 of the I-shape. A plow blade assembly 300 is mounted at the rearward end 202 of each plow arm 200. Each plow blade assembly 300 is supportable on a plow blade base or rest 401, 402 attached to the railroad car module 100 within the rearward inset portions 106, 107 of the I-shape at the rearward end of the railroad car module. The plow blade assemblies 300 are adapted to receive a tether or restraint 500 therebetween which prevents the plow arms 200 from pivoting sideways a distance sufficient to allow the plow blade assemblies 300 to be displaced from their respective plow blade bases 401, 402.

As explained previously, the cable laying apparatus of the present invention is of the type generally known to those skilled in the art and preferably is of the type which is positioned onto a module mounted onto a flat railroad car. Though not shown, the railroad car has mounted thereon all of the machinery necessary to operate the hydraulics of the cable laying equipment. The railroad car, itself, is adapted to be moved along the track by an auxiliary source, such as a locomotive or engine attached thereto.

Each plow arm 200 (FIG. 2) includes substantially parallel upper and lower pivot arms 201, 202 pivotally mounted to a pivot base 203. The two pivot arms 201, 202 are pivotable vertically about pivot points 204, 205 on the pivot base 203. Each pivot base 203 in turn is pivotally mounted to a hitch plate 206 connected to the railroad car module. The pivot bases 203 pivot about a vertical axis 207 through the hitch plate 206 (FIG. 1) so that the plow arms 200 swing outwardly from the railroad car module 100, as well as vertically with respect thereto. An hydraulic cylinder 208 connected to the pivot base 203 and a cylinder 209 connected to the lower plow arm 202 produce the pivoting motions which swing the pivot arm 200 and cause the parallel arms 201, 202 to move vertically. Other forms of producing this movement known to those skilled in the art may be substituted.

The ends 210, 211 of the upper and lower plow arms 201, 202, respectively, are pivotally connected to a plow blade support 212. The plow blade support 212 is adapted to hold the plow blade assembly 300 so that the plow blade assembly 300 can be pivoted about its vertical axis and also at an angle to the vertical.

The plow blade support 212 includes a stationary member 213 connected to the plow arms 201, 202 and a rotatable member 214 abutting the stationary member 213 at a junction 215 where the collar 216 of the stationary member 213 abuts the collar 217 of the rotatable member 214. An internal longitudinal shaft (not shown) extends between the stationary member 213 and the rotatable member 214 to form an axis of rotation for the rotatable member 214. In order to prevent the two collars 216, 217 from separating from each other (and thus cause the internal longitudinal shaft to snap), a collar clamp 230 is provided on the underside of the collars 216, 217.

As further shown in FIGS. 1 and 2, mounted on the collar 216 of the stationary member 213 is an hydraulic cylinder 219 with a piston 220 therefrom connected to the rotatable member 214 for rotating the rotatable member 214 about the previously mentioned shaft which is perpendicular to the abutting collars 216, 217. While in the preferred embodiment an hydraulic cylinder 219 for rotating the rotatable member 214 is provided, it is recognized that suitable substitutes for an hydraulic cylinder to rotate the rotatable member are available.

The plow blade assembly 300 which comprises a plow blade 301 affixed to the rotatable member 214 is moved with respect to its vertical axis by an additional hydraulic cylinder 221 (or other suitable means) connected to the rotatable member 214 and to the plow assembly 300.

As further shown in FIGS. 1 and 2, and in much more detail in FIG. 3, plow blade bases or rests 401, 402 are provided so that the bottom of each plow blade assembly 300 can rest thereon. The plow blade rests 401, 402 in the preferred embodiments are provided as part of the railroad car module and are essentially plates positioned toward the rearward ends 106, 107 of the inset of the I-shape of the railroad car module 100. Each of the plow blade rests 401, 402 has an L-shaped stop bar 403, 404, respectively, positioned inwardly from the outer edge thereof. The stop bars 403, 404 are angled metal bracket members affixed to the blade rests 401, 402 which have upright projections or stops 405, 406 projecting from base pieces 407, 408 affixed (e.g., welded) to the blade rests 401, 402. The stop bars 403, 404 are positioned on the blade rests 401, 402 in a location which allows the plow assembly 300 and its plow blade member 301 to be lowered onto the blade rests between the upright stops 405, 406 and the center portion 105 of the I-shaped railroad car module. Thus, the stops 405, 406 can abut the outer edges of the plow blades 301 of the plow assemblies 300 to prevent the plow blades 301 from slipping off of the blade rests 401, 402 due to vibration of the blade rests when the railroad car is in motion and the blades 301 are resting on the blade rests.

An added feature which prevents the plow assemblies 300 from sliding off of the blade rests 401, 402 is the tethering assembly 500 fitted between the two plow assemblies 300. As shown in FIGS. 1 and 3, the tethering assembly 500 includes a chain 501 or other suitably strong restraining material of a length less than the distance from the inside edge of one blade rest to the outside edge of the other blade rest (the distance A in FIG. 1). The chain 501 is fitted with fastening mechanisms at each end thereof designed to fit through and hold the blades 301 of the plow assemblies 300. In the preferred embodiment, heavy metal pins 502, 503 with threaded ends are welded to the chain 501, and the threaded ends receive threaded nuts 504, 505, respectively.

After the plow blades 301 have been lowered onto the blade rests 401, 402 between the stops 405, 406 and the inside wall of the longitudinal portion 105 of the I-shaped railroad car module, the chain 501 is stretched between the plow blades 301 and the two threaded pins 502, 503 are passed through holes 302 in the plow blades 301. The pins 502, 503 are secured in the holes by threading the nuts 504, 505 thereonto, whereby the nuts force against the outer edges of the plow blades 301. The nuts 504, 505 are further held in place by cotter pins 506, 507 fitted through holes 508, 509, respectively, in the threaded pins 502, 503, after the nuts are threaded thereon. By connecting the two plow blades 301 with the tethering assembly 500, the plow blade assemblies 300 are prevented from spreading far enough apart to allow either of them to slip off of its associated blade rest, if it should become positioned on the outside of its associated stop 405, 406. If the chain 501 is longer than necessary, the length of the chain may be reduced by means of a clamping mechanism (not shown) so that the chain will not be long enough to allow either blade assembly 300 to slide off its plow blade rest.

Unlike the prior art railroad car-mounted cable laying devices which required removal of the plow blade prior to transporting the device over the rails, with the present apparatus, the entire cable laying apparatus can be transported intact without the time consuming efforts of disassembling and reassembling the plow blade assembly on the plow arm. Instead, each plow blade assembly 300 can simply be lifted onto its blade rest between the stop and the elongated central portion of the railroad car module. Thereafter, the chain 501 is attached by means of the pins and nuts between the plow blades 301, thus securing the two plow blade assemblies 300 onto the blade rests. By providing the stop bars and the restraining chain to prevent the cable laying assemblies 101, 102 from accidently spreading outward from the railroad car, the entire cable laying apparatus can be safely and securely transported over the rails with the plow blade assemblies attached thereto.

Without further elaboration the foregoing will so fully illustrate my invention that others may, by applying current or future knowledge, adopt the same for use under various conditions of service.

I claim:

1. An apparatus for holding the plow blade of a railroad car-mounted cable laying device, said apparatus comprising:

support means on said railroad car for supporting said plow blade thereon; and stop means on said support means for prohibiting said plow blade from sliding off said support means.

2. An apparatus as claimed in claim 1, wherein:

said support means comprises a support plate on said railroad car; and said stop means comprises a projection extending upward from said support plate.

3. An apparatus as claimed in claim 1, wherein:

said railroad car has first and second plow blades mounted thereon; and individual support means and stop means are provided for each plow blade; and further comprising:

tethering means between said plow blades for constraining said plow blades and prohibiting said plow blades from sliding off said support means.

4. An apparatus as claimed in claim 3, wherein said tethering means comprises:

a chain;

first and second fastening means at each end of said chain for interconnecting said first and second plow blades, said first fastening means being fastened to said first plow blade and said second fastening means being fastened to said second plow blade.

5. An apparatus as claimed in claim 4, wherein said first and second fastening means are removably fastened to said first and second plow blades.

6. An apparatus as claimed in claim 4, wherein each of said first and second fastening means is comprised of:

a pin member connected to one end of said chain, said pin member being threaded on the end opposite the end connected to said chain; and a nut threaded onto said pin member.

7. An apparatus as claimed in claim 6, wherein said pin member has a longitudinal axis and a hole therethrough perpendicular to said axis, and further comprising a second pin through said hole in said pin member.

* * * * *